United States Patent Office 2,938,917
Patented May 31, 1960

2,938,917

16 ALPHA-17 ALPHA-20 BETA-21 BETA-TETRAHYDROXY 4-PREGNENES AND ESTERS THEREOF

Seymour Bernstein, New City, N.Y., John Garbarini, Dumont, and Robert H. Lenhard, Ridgefield Park, N.J., and Leland L. Smith, New City, N.Y., assignors to American Cyanamid Company, New York, N.Y., a corporation of Maine No Drawing. Filed Mar. 30, 1959, Ser. No. 802,661

9 Claims. (Cl. 260—397.45)

This invention relates to new steroid compounds. More particularly, it relates to polyhydroxy steroids and esters thereof of the pregnane series and methods of preparing the same.

The steroids of the present invention can be illustrated by the following structural formula

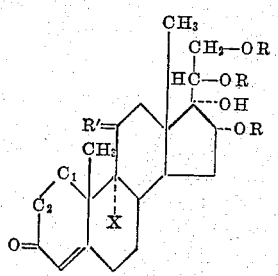

in which R is a member of the group consisting of hydrogen and lower alkanoyl radicals, R' is a member of the group consisting of

and O= groups, X is a member of the group consisting of hydrogen and halogen atoms and —$C_1$—$C_2$— is a divalent radical of the group consisting of —$CH_2$—$CH_2$— and —CH=CH— radicals.

The compounds of the present invention are in general crystalline solids with relatively high melting points. They are comparatively insoluble in water and somewhat soluble in the usual organic solvents.

The process of the present invention uses as starting material polyhydroxy steroids or esters of the pregnane series having a keto group in the 20 position. These can be for example; 16α,21-diacetoxy-9α-fluoro-11β,17α-dihydroxy-1,4-pregnadiene-3,20-dione, 16α,21-diacetoxy-9α-fluoro - 17α-hydroxy-1,4-pregnadiene-3,11,20-trione, 16α, 21 - diacetoxy-11β,17α-dihydroxy-4-pregnene-3,20-dione, 16α,21 - diacetoxy - 9α-fluoro-11β,17α-dihydroxy-4-pregnene-3,20-dione, 16α,21diacetoxy-9α-fluoro-17α-hydroxy-4-pregnene-3,11,20-trione, 16α,21-diacetoxy-11β,17α-dihydroxy-1,4-pregnadiene-3,20-dione, 16α,21-diacetoxy-17α-hydroxy - 1,4 - pregnadiene-3,11,20-trione, 9α-fluoro-11β, 16α,17α,21-tetrahydroxy-4-pregnene-3,20-dione, 9α-fluoro-16α,17α,21-trihydroxy-4-pregnene-3,11,20-trione, 9α-fluoro - 11β,16α,17α,21-tetrahydroxy-1,4-pregnadiene-3,20-dione, 9α - fluoro-16α,17α,21-trihydroxy-1,4-pregnadiene-3, 11,20-trione and the like.

The present process is carried out by dissolving or suspending the 20-keto steroid in a solvent such as for example alcohols, alcohol-pyridine mixtures, and the like. The hydrogenation catalyst such as sodium borohydride is added and the mixture maintained at a temperature within the range of —5° to 10° C. The reaction is completed in a matter of a few minutes to several hours depending on the starting material and conditions used.

The completion of the reaction can be determined by use of the blue tetrazolium color test for the presence of the keto group in the 20 position. The product can be recovered in the usual manner for example adding water and removing the reaction solvent, extracting with an organic solvent such as ethyl acetate and purifying the product by crystallization or other means.

The compounds of the present invention are useful for their ability to influence electrolyte excretion. This activity is useful in the treatment of edema and other conditions manufacturing themselves by the retention of fluids in the tissue.

The following examples describe in greater detail the preparation of 20-dihydro steroids of the present invention.

EXAMPLE I

*Preparation of 16α,21-diacetoxy-9α-fluoro-11β,17α,20β-trihydroxy-1,4-pregnadien-3-one*

One gram of triamcinolone 16α,21-diacetate described in U.S. Patent 2,789,118 is dissolved in 25 ml. of dry methanol at 0° C. and 0.118 g. of sodium borohydride is added. After 45 minutes the reaction mixture did not give a blue tetrazolium color test on filter paper. The reaction is quenched in water, the methanol removed under reduced pressure and the aqueous phase extracted with ethyl acetate. The extracts are washed with brine, dried over anhydrous magnesium sulfate, and concentrated to dryness. The crystalline residue, 800 mg., is homogeneous on papergram analysis, negative to tetrazolium blue, but with positive ultraviolet absorption. Recrystallization from acetone and from acetone-petroleum ether solution gives a purified product melting at 253–256.5° C., dec., $[\alpha]_D^{22}+80.3°$ (chloroform).

EXAMPLE II

*Preparation of 16α,20β,21-triacetoxy-9α-fluoro-11β,17α-dihydroxy-1,4-pregnadien-3-one*

16α,21 - diacetoxy-9α-fluoro-11β,17α,20β-trihydroxy-1, 4-pregnadien-3-one prepared as in Example I is dissolved in dry pyridine, and acetic anhydride is added. After 15 hrs. at room temperature approximately 10 volumes of methanol is added and the solution is evaporated to dryness under reduced pressure. This treatment is repeated until the odor of pyridine is eliminated. The final residue is crystallized from methanol, washed with petroleum ether and dried. This material is recrystallized from ethanol containing 1/40 volume of chloroform.

Further recrystallization from methanol/acetone yields the pure triacetate, M.P. 305–307° C. dec., $[\alpha]_D$—2.4° (chloroform).

EXAMPLE III

*Preparation of 9α - fluoro - 11β,16α,17α,20β,21-pentahydroxy-1,4-pregnadien-3-one*

A solution of 1.0 g. of 16α,20β,21-triacetoxy-9α-fluoro-11β,17α-dihydroxy-1,4-pregnadien-3-one prepared as in Example II in 75 ml. of dry methanol is purged of air with nitrogen, and a similarly purged solution of 145 mg. of sodium metal in 30 ml. of methanol is added. The solution is stirred under nitrogen for 15 minutes, quenched with 6 ml. of glacial acetic acid, and evaporated to dryness under reduced pressure. The solids are washed with 70 ml. of water, yielding 0.7 g. of crude product, M.P. 257–260° C. (Kofler) dec., homogeneous on papergrams. The product is dissolved in hot methanol (12 ml.), and petroleum ether (B.P. 30–60°) is added to turbidity (ca. 12 ml.). After 12 hours at room temperature the crystals are filtered, wt. 0.3 g. $\lambda_{max}$ 239 mμ. (ε15,000), M.P. 263–265° C. dec. (Kofler block). Evaporation of the filtrates affords 0.4 g. of product, $\lambda_{max}$ 239 m$\mu$. ($\epsilon$13,500), which on recrystallization affords 0.2 g. of product $\lambda_{max}$ 239 m$\mu$. ($\epsilon$14,300), M.P. 262–264° C. dec. (Kofler block).

An analytical sample was prepared from the $\epsilon$15,000 crop of crystals. After recrystallization from methanol/petroleum ether and from methanol the sample: $\lambda_{max}$ 238 m$\mu$. ($\epsilon$14,600), M.P. 262–263.5° C. dec. (Kofler block), $[\alpha]_D^{22}$ +15.1° (methanol).

EXAMPLE IV

*Preparation of 9α-fluoro-11β,16α,17α,20β,21-pentahydroxy-1,4-pregnadien-3-one*

One gram of triamcinolone described in U.S. Patent 2,789,118 as $\Delta^{1,4}$-pregnadiene-9α-fluoro-11β,16α,17α,21-tetrol-3,20-dione is dissolved in 30 ml. of a solution of 0.144 g. of sodium borohydride in methanol at 0°. Samples are withdrawn from the chilled solution and spoted on filter paper and sprayed with tetrazolium blue. At the end of 2.5 hours the reaction is quenched with 100 ml. of water, the methanol evaporated under reduced pressure and the aqueous solution extracted with ethyl acetate. From the ethyl acetate extract residue is crystallized (acetone/petroleum ether) 0.15 g. of product which is identified as 20-dihydrotriamcinolone by papergram mobility and color tests and by absorption spectra in concentrated sulfuric acid.

EXAMPLE V

*Preparation of 16α,20β,21-triacetoxy-9α-fluoro-17α-hydroxy-1,4-pregnadiene-3,11-dione*

Two-hundred milligrams of 16α,20β,21-triacetoxy-9α-fluoro-11β,17α-dihydroxy-1,4-pregnadien-3-one prepared in Example II above is dissolved in 10 ml. of dry pyridine, and a solution of 150 mg. of chromium trioxide in 8 ml. of pyridine is added. The mixture is allowed to stand overnight. Ten milliliters of methanol is added, and the solvents are evaporated off under reduced pressure. Water is added to the dried residue and the mixture is extracted with five-200 ml. portions of ethyl acetate. The combined extracts are dried over anhydrous sodium sulfate and evaporated to a solid residue. This residue is crystallized and recrystallized from ethyl acetate-petroleum ether solution, giving a purified product.

EXAMPLE VI

*Preparation of 16α,20β,21-triacetoxy-11β,17α-dihydroxy-4-pregnen-3-one*

One gram of 16α,21-diacetoxy-11β,17α-dihydroxy-4-pregnene-3,20-dione described in U.S. Patent 2,777,864 is dissolved in 25 ml. of dry methanol at 0° C., and 0.118 g. of sodium borohydride is added. After 45 minutes, the reaction mixture no longer gives a tetrazolium blue color test on filter paper. The reaction is quenched with water, the methanol removed under reduced pressure and the aqueous phase is extracted with ethyl acetate. The extracts are washed with brine, dried over magnesium sulfate and concentrated to dryness. The residue is dissolved in dry pyridine and acetic anhydride is added. After about 15 hours at room temperature, 10 volumes of methanol is added and the solution is evaporated to dryness. This treatment is repeated until the odor of pyridine is eliminated. The final residue is crystallized from methanol and recrystallized from ethanol-chloroform solution.

EXAMPLE VII

*Preparation of 16α,20β,21-triacetoxy-9α-bromo-11β,17α-dihydroxy-4-pregnen-3-one*

16α,21-diacetoxy-17α-hydroxy-4,9(11)-pregnadiene-3,20-dione described in U.S. Patent 2,773,080 is dissolved in dry methanol at 0° C., and sodium borohydride is added. After about 45 minutes, when the reaction mixture no longer gives a tetrazolium blue color test on filter paper, the reaction is quenched with water, the methanol removed under reduced pressure and the aqueous phase extracted with ethyl acetate. The extracts are washed with brine, dried over anhydrous magnesium sulfate, and concentrated to dryness. The residue is dissolved in dry pyridine and acetic anhydride is added. After standing overnight at room temperature, 10 volumes of methanol is added and the solution is evaporated to dryness. This treatment is repeated until the odor of pyridine is eliminated. The final residue of 16α,20β,21-triacetoxy-17α-hydroxy-4,9(11)-pregnadien-3-one is dissolved in a solution of dioxane and water. This solution is treated with N-bromoacetamide and 10% perchloric acid. After allowing this mixture to stand for about 15 minutes at 20° C., excess sodium sulfite and water is added. The resultant soft solid is extracted with chloroform, and the extract is washed with saturated saline, dried, filtered through diatomaceous earth, and evaporated to dryness. The crude bromohydrin is crystallized and recrystallized from acetone-petroleum ether to give a purified product.

EXAMPLE VIII

*Preparation of 16α,20β,21-triacetoxy-9α-fluoro-11β,17α-dihydroxy-4-pregnen-3-one*

A solution of 16α,21-diacetoxy-9α-fluoro-11β,17α-dihydroxy-4-pregnene-3,20-dione as described in U.S. Patent 2,773,080 (200 mg.) in methanol (40 ml.) is cooled to 0° and treated with sodium borohydride (24 mg.). After remaining at 0° for one hour, the solution is acidified with glacial acetic acid (0.1 ml.) and the methanol is evaporated under reduced pressure. The residue is dissolved in ethyl acetate, washed with saturated sodium bicarbonate and saline, dried over magnesium sulfate, filtered through diatomaceous earth and evaporated to a colorless glass. The glassy residue is dissolved in pyridine (5 ml.) and treated with acetic anhydride (1 ml.). After standing at room temperature for 16 hours, methanol is added and the solvents are evaporated under reduced pressure. The white solid (negative blue tetrazolium test) so obtained is crystallized from acetone-petroleum ether to afford 112 mg. of product. Two additional crystallizations from acetone-petroleum ether gives a product melting at 281–283° C.

EXAMPLE IX

*Preparation of 9α-fluoro-11β,16α,17α,20β,21-pentahydroxy-4-pregnen-3-one*

A solution of 16α,20β,21-triacetoxy-9α-fluoro-11β,17α-dihydroxy-4-pregnen-3-one as prepared in Example VIII above (250 mg.) in methanol (50 ml.) is treated with sodium methoxide (33 mg. of sodium in 7 ml. of methanol). Dry nitrogen is bubbled through the reaction mixture, and after ten minutes at room temperature, the reaction is stopped by the addition of glacial acetic acid (0.14 ml.). The solution is then evaporated under reduced pressure to a white solid. The residue is partially dissolved in acetone and the insoluble sodium acetate is removed by filtration. Concentration of the filtrate with simultaneous addition of petroleum-ether gives 125 mg. of product. Two recrystallizations from the same solvent pair gives a product having a melting point of 177.5–180° C. with effervescence.

EXAMPLE X

*Preparation of 16α,20β,21-triacetoxy-9α-fluoro-17α-hydroxy-pregnene-3,11-dione*

Two hundred milligrams of 16α,20β,21-triacetoxy-9α-fluoro-11β,17α-dihydroxy-4-pregnen-3-one as prepared in Example VIII above is dissolved in 10 ml. of dry pyridine, and a solution of 150 mgm. of chromium trioxide in 8 ml. of pyridine is added. The mixture is allowed to stand overnight. Ten milliliters of methanol is added, and the solvents are evaporated off under reduced pressure. Water is added to the dried residue and the mixture is extracted with five-200 ml. portions of ethyl acetate. The combined extracts are dried over anhydrous sodium sulfate and evaporated to a solid residue. This residue is crystallized and recrystallized from ethyl acetate-petroleum ether solution, giving a purified product.

We claim:
1. The compound 16α,20β,21-triacetoxy-9α-fluoro-11β,17α-dihydroxy-1,4-pregnadien-3-one.
2. The compound 9α-fluoro-11β,16α,17α,20β,21-pentahydroxy-1,4-pregnadien-3-one.
3. The compound 16α,20β,21-triacetoxy-9α-fluoro-17α-hydroxy-1,4-pregnadiene-3,11-dione.
4. The compound 16α,20β,21-triacetoxy-11β,17α-dihydroxy-4-pregnen-3-one.
5. The compound 16α,20β,21-triacetoxy-9α-bromo-11β,17α-dihydroxy-4-pregnen-3-one.
6. The compound 16α,20β,21-triacetoxy-9α-fluoro-11β,17α-dihydroxy-4-pregnen-3-one.
7. The compound 9α-fluoro-11β,16α,17α,20β,21-pentahydroxy-4-pregnen-3-one.
8. The compound 16α,20β,21-triacetoxy-9α-fluoro-17α-hydroxy-4-pregnene-3,11-dione.
9. Compounds having the general formula

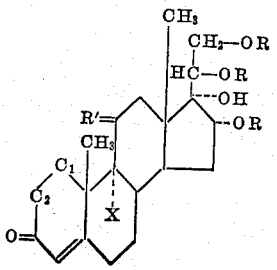

in which R is a member of the group consisting of hydrogen and lower alkanoyl radicals, R' is a member of the group consisting of

and O= groups, X is a member of the group consisting of hydrogen, bromine and fluorine atoms and —C$_1$—C$_2$— is a divalent radical of the group consisting of $$-CH_2-CH_2-$$

and —CH=CH— radicals.

References Cited in the file of this patent
UNITED STATES PATENTS

| | | |
|---|---|---|
| 2,773,080 | Bernstein et al. | Dec. 4, 1956 |
| 2,789,118 | Bernstein et al. | Apr. 16, 1957 |